United States Patent Office 3,717,437
Patented Feb. 20, 1973

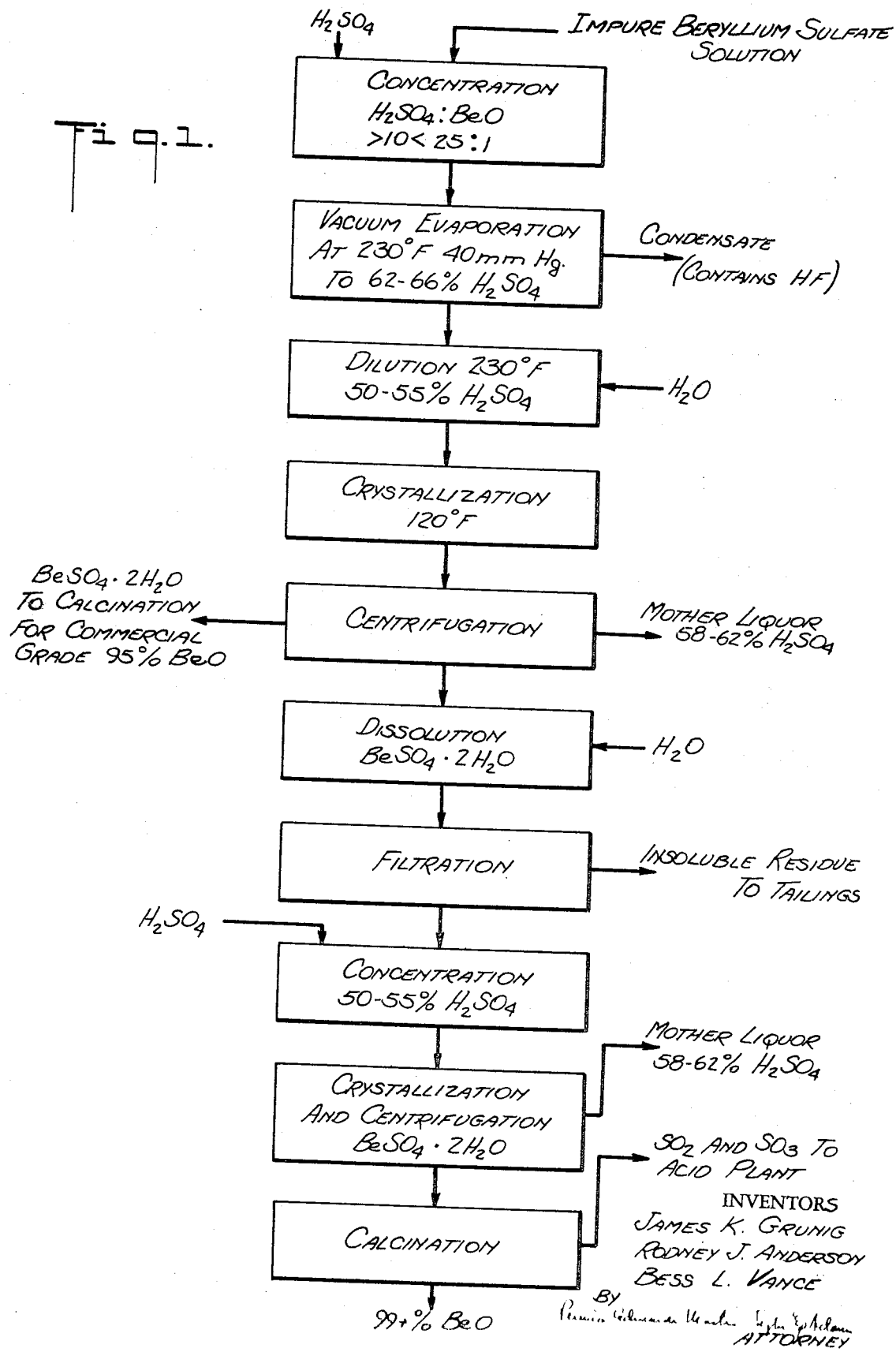

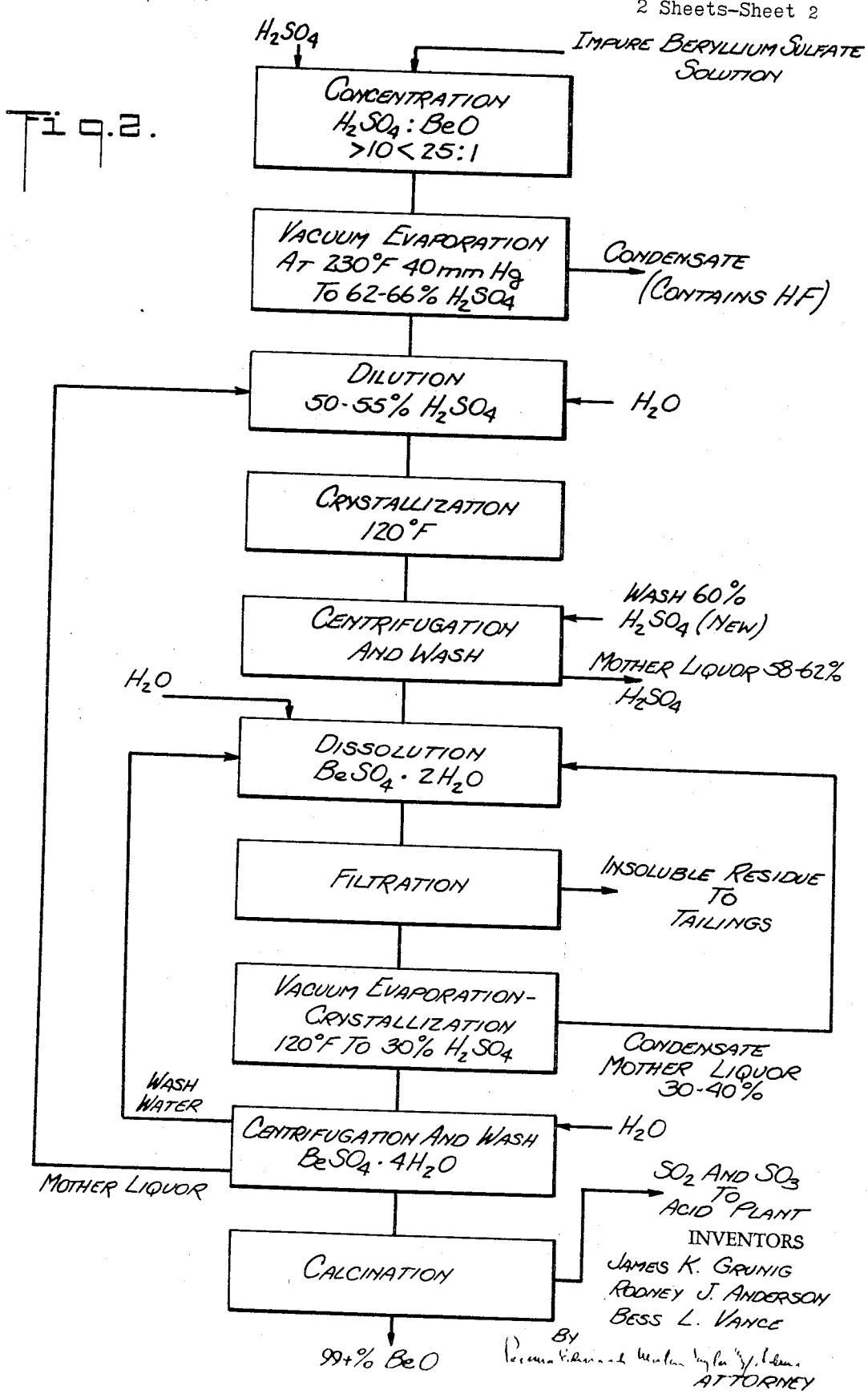

3,717,437
CRYSTALLIZATION OF BERYLLIUM SULFATE
James K. Grunig, Rodney J. Anderson, and Bess L. Vance, Tucson, Ariz., assignors to The Anaconda Company
Filed Dec. 14, 1970, Ser. No. 97,841
Int. Cl. C22b 59/00
U.S. Cl. 23—24 B                                16 Claims

ABSTRACT OF THE DISCLOSURE

A process for the recovery of substantially pure beryllium oxide from an impure aqueous sulfuric acid solution containing dissolved beryllium sulfate by crystallizing beryllium sulfate from the solution after concentrating it to about 50% to 55% by weight of sulfuric acid and then calcining the crystallized beryllium sulfate.

BACKGROUND OF THE INVENTION

Several processes have been developed for the extraction of beryllium values from beryllium-bearing materials. By these known prior art processes, it has been difficult to separate compounds of such material as aluminum, iron, magnesium, calcium and fluorine from the beryllium compound component. Hence, a pure final beryllium product is relatively costly to produce.

For certain uses of beryllium oxide, e.g., in nuclear reactors, almost complete freedom from such contamination is required. Further high purity beryllium oxide finds importance as a starting material for electrowinning extremely pure beryllium metal from a molten beryllium salt solution. As a result, there is a relatively large demand for a practical and economical process capable of uniformly producing beryllium oxide which is substantially free from contamination.

SUMMARY OF THE INVENTION

We have discovered a method for producing a high yield of substantially pure beryllium oxide having superior physical characteristics in such quantity and of such quality as to make it an economically feasible and attractive process. We have discovered the favorable concentrations of sulfuric acid and beryllium sulfate to sufficiently depress the solubility of beryllium sulfate to a point whereupon after cooling the beryllium sulfate is substantially insoluble and precipitates out as crystals which upon subsequent calcination yield beryllium oxide having a purity of 99+%.

It is therefore an object of this invention to provide a process which will result in a high yield extraction of beryllium oxide from beryllium-bearing materials.

It is also an object of this invention to provide a feasible process which will result in the production of an extremely pure beryllium oxide.

It is a further object of this invention to provide an economical process for producing beryllium oxide from beryllium-bearing materials which process permits the easy separation of the beryllium values from other compounds which heretofore have been very difficult to separate.

Accordingly, to accomplish the above objects and other objects, the present invention contemplates a process for recovering substantially pure beryllium oxide from an impure aqueous sulfuric acid solution containing dissolved beryllium sulfate which comprises first treating the solution to form a solution containing about 50% to 55% by weight of sulfuric acid. The treated solution is then cooled to a temperature sufficiently low to crystallize beryllium sulfate therefrom and produce an acid mother liquor containing about 58% to 62% by weight sulfuric acid. The acidic mother liquor is thereafter separated from the beryllium sulfate crystals and the beryllium sulfate crystals are calcined to form beryllium oxide of sufficiently high purity for most uses. If a higher purity beryllium oxide is desired, then after separating the acidic mother liquor from the beryllium sulfate crystals and prior to calcining, the separated beryllium sulfate crystals are redissolved in an aqueous solution and treated such that, upon recrystallization and mother liquor, separation, $BeSO_4 \cdot 2H_2O$ or $BeSO_4 \cdot 4H_2O$ crystals are produced. After this recrystallization and separation, the beryllium sulfate crystals would be subject to the calcining operation to form high purity beryllium oxide.

A number of beryllium-bearing materials are suitable for treatment by the method of the present invention. These materials include both low and medium grade beryllium containing ores, for example, ores from the Spor Mountain Region in the United States. Beryllium is thought to occur in these ores mainly as bertrandite ($4BeO \cdot 2SiO_2 \cdot 2 \cdot 8H_2O$) and/or beryliferous saponite. In contrast to bertrandite, beryl ($3BeO \cdot Al_2O_3 \cdot 6SiO_2$) and phenacite ($Be_2SiO_4$), which are other forms of naturally occurring beryllium, are not readily soluble in moderate acid concentrations. However, these materials may be rendered acid soluble by such prior art processes as fluoride sintering and alkali fusion. The invention is not limited to these particular ores but includes within its scope any beryllium-bearing material which is either soluble or which may be rendered soluble in sulfuric acid to form a beryllium sulfate solution, regardless of the particular beryllium concentration.

The beryllium ore or other raw material containing the beryllium is first treated by any of the prior art methods to produce an aqueous sulfuric acid solution containing dissolved beryllium sulfate. This solution, which may contain a substantial amount of impurities, is the starting solution for the process of our invention. The aqueous solution can, for example, be obtained from the eluates of a liquid-ion exchange (LIX) process, a resin in column (RIC) process, or a leaching process. In commonly assigned and co-pending application Ser. No. 710,-098 filed Mar. 6, 1968 and entitled Extraction of Beryllium from Ores, there is disclosed an extraction process for obtaining pure beryllium compounds from low grade beryllium ores. The beryllium ore is first leached with a mineral acid and then the pH of the leach solution is raised to about a pH of 4.0 to precipitate the major impurities. Beryllium hydroxide is then precipitated by raising the pH of the solution to about a pH of 8.0–8.4. In accordance with the requirement for the present invention, the beryllium hydroxide from this process would then be partially dried and then dissolved with sulfuric acid to a slightly acid solution of beryllium sulfate. This solution could well be used as the starting solution in our invention.

BRIEF DESCRIPTION OF THE DRAWING

FIG. 1 illustrates a flow sheet of one process for obtaining pure beryllium oxide in accordance with the invention.

FIG. 2 illustrates an alternate process for obtaining pure beryllium oxide.

DESCRIPTION OF THE PREFERRED EMBODIMENTS

Referring to FIG. 1, the starting solution consists of an extract from a resin in column (RIC) process used for recovering beryllium values. According to the invention, the extract solution should have a concentration by weight of sulfuric acid of at least about ten times but less than twenty-five times as great as that of the dissolved beryllium sulfate, expressed as beryllium oxide. It has been found that the amount of extract solution within this range contains a sufficient liquid volume to solubilize any impurities, such as aluminum or magnesium etc., for removal during the subsequent steps of the method described herein and yet is not too large to dilute the beryllium to such an extent to make the recovery uneconomical. Therefore, if necessary, the acid concentration is adjusted to form an aqueous solution which contains a weight ratio of $H_2SO_4$:BeO in the above range. The solution also contains dissolved impurities carried through from the ore or other raw material used. A typical sampling of the extract, after it has been adjusted to the desired $H_2SO_4$:BeO ratio, contains about substantially the following:

| | G./l. |
|---|---|
| $BeSO_4$ | 86.3 |
| $Al_2(SO_4)_3$ | 14.1 |
| $MgSO_4$ | 2.07 |
| $CaSO_4$ | 2.31 |
| $MnSO_4$ | .96 |
| $FeSO_4$ | .11 |
| F | 3.10 |
| $H_2O$ | 744.5 |
| $H_2SO_4$ | 390 |

Wt. percent $H_2SO_4$, 31.

The aqueous solution is now in condition for treatment to selectively crystallize the beryllium sulfate therefrom while allowing the other sulfates which have been formed, (e.g., aluminum sulfate, magnesium sulfate, etc.) to pass with the mother liquor. The solution is placed in a vacuum evaporator where the solution is evaporated at 230° F. and under a pressure of 40 mm. of Hg until it contains about 62% to 66% by weight of sulfuric acid. A typical evaporator discharge at this stage contains substantially the following:

| | G./l. |
|---|---|
| $BeSO_4$ | 240.0 |
| $Al_2(SO_4)_3$ | 39.3 |
| $MgSO_4$ | 5.78 |
| $CaSO_4$ | 6.43 |
| $MnSO_4$ | 2.68 |
| $FeSO_4$ | .31 |
| F | 1.10 |
| $H_2O$ | 290 |
| $H_2SO_4$ | 1088 |

Wt. percent $H_2SO_4$, 65.

It has been found that by vacuum evaporating a solution having the above $H_2SO_4$:BeO ratio to a solution containing this sulfuric acid concentration, it is possible to eliminate the fluorine impurity in the solution in the form of HF. The fluorine is removed with the condensate from the evaporator and both are recycled back to the ore leaching process. The evaporator discharge is then diluted until its acid concentration is within the range of about 50% to 55% by weight sulfuric acid. A typical sampling of this crystallization feed contains substantially the following:

| | G./l. |
|---|---|
| $BeSO_4$ | 168.0 |
| $Al_2(SO_4)_3$ | 27.5 |
| $MgSO_4$ | 4.05 |
| $CaSO_4$ | 4.50 |
| $MnSO_4$ | 1.88 |
| $FeSO_4$ | .22 |
| F | .77 |
| $H_2O$ | 508 |
| $H_2SO_4$ | 760 |

Wt. percent $H_2SO_4$, 52.

Such dilution serves to allow some crystal growth while still serving to substantially completely depress the beryllium sulfate solubility in the crystallization mother liquor at conveniently attainable emperatures during subsequent crystallization.

After the solution has been diluted to the degree required, it is transferred to a crystallizing tank where the temperature of the solution may be reduced at a controlled rate. Since the solubility of beryllium sulfate decreases with decreasing temperature, cooling of the solution causes the beryllium sulfate to crystallize from the acidic solution. The beryllium sulfate is preferably cooled to a temperature of about 120° F. and is held at such a temperature for a time sufficient to allow for crystallization of as much of the beryllium sulfate as will separate. When an extract solution having a sulfuric acid concentration within the range of about 50% to 55% by weight is cooled to crystallize beryllium sulfate from the acid solution, the acidic mother liquor produced therefrom will have a sulfuric acid concentration of between about 58% to 62% by weight. It was found that, at a mother liquor acid concentration within the aforementioned range, the solubility of beryllium sulfate in the extract solution is depressed at a maximum with the impurities remaining in the solution. At an acid concentration above the stated range, the aluminum impurity, for example, will become insolubilized thereby interfering with the beryllium-aluminum separation. On the other hand at an acid concentration below the above range, both aluminum and beryllium would remain in solution.

Berylluim sulfate crystallizes inthe form of $$BeSO_4 \cdot 2H_2O$$

crystals which are advantageously removed from the mother liquor by centrifuging. However, the crystals may also be removed from the mother liquor by any of the other well-known separating processes, e.g., filtering, or the like. A typical sampling of the crystallization mother liquor which is removed from the centrifuging operation contains substantially the following:

| | G./l. |
|---|---|
| $BeSO_4$ | 19.0 |
| $Al_2(SO_4)_3$ | 31.0 |
| $MgSO_4$ | 4.59 |
| $CaSO_4$ | 5.08 |
| $MnSO_4$ | 2.12 |
| $FeSO_4$ | .24 |
| F | .87 |
| $H_2O$ | 507 |
| $H_2SO_4$ | 860 |

Wt. percent $H_2SO_4$, 60.

The highly acidic mother liquor from the crystallization process may be recycled and utilized as an ore leach acid in the RIC process. By doing this, substantially all of the impurities, and also the uncrystallized beryllium, are returned to the leach solution.

The separated beryllium sulfate crystals may be fired at a temperature of about 1000° C. (or higher) to produce a commercial grade of beryllium oxide. Commercial grade beryllium has a purity of only about 95% by weight.

To obtain an even purer form of beryllium oxide, the solution containing dissolved beryllium values may be subject to a double crystallization process as illustrated in FIG. 1. Instead of calcining the first crop of beryllium sulfate crystals which are recovered from the centrifuging operation, these crystals may be subjected to the following operation.

The pure beryllium sulfate crystals are first dissolved in water at a temperature ranging from about 75° F. to 150° F. to form a solution containing from 10 to 90 or more grams of BeO per liter. Subsequent to this, the solution is filtered to remove the insoluble impurities, e.g., calcium sulfate. A typical solution formed on the first dissolution of the crystals contains substantially the following:

|  | G./l. |
|---|---|
| $BeSO_4$ | 248 |
| $Al_2(SO_4)_3$ | .60 |
| $MgSO_4$ | .42 |
| $CaSO_4$ | .56 |
| $MnSO_4$ | .11 |
| $FeSO_4$ | .08 |
| F | None |
| $H_2O$ | 930 |
| $H_2SO_4$ | 80 |

Wt. percent $H_2SO_4$, 6.6.

Enough sulfuric acid is added to the solution to again form a solution containing about 50% to 55% by weight sulfuric acid, producing a typical solution containing substantially the following:

|  | G./l. |
|---|---|
| $BeSO_4$ | 122 |
| $Al_2(SO_4)_3$ | .37 |
| $MgSO_4$ | .26 |
| $CaSO_4$ | .35 |
| $MnSO_4$ | .07 |
| $FeSO_4$ | .05 |
| F | None |
| $H_2O$ | 635 |
| $H_2SO_4$ | 799 |

Wt. percent $H_2SO_4$, 52.7.

The beryllium sulfate solution is then transferred to a crystallizing tank or fed to a recirculating crystallizer. The temperature in the tank is lowered to about 80° F. to effect crystallization of the beryllium sulfate and thereby form dihydrated $BeSO_4 \cdot 2H_2O$ crystals. Subsequent to this recrystallization operation, the solution containing the beryllium sulfate crystals is subjected to centrifugation for separating the mother liquor from the crystals. A typical sampling of the mother liquor separated from the crystals at this second crystallization stage contains substantially the following:

|  | G./l. |
|---|---|
| $BeSO_4$ | 30 |
| $Al_2(SO_4)_3$ | .44 |
| $MgSO_4$ | .31 |
| $CaSO_4$ | .42 |
| $MnSO_4$ | .08 |
| $FeSO_4$ | .06 |
| F | None |
| $H_2O$ | 650 |
| $H_2SO_4$ | 865 |

Wt. percent $H_2SO_4$, 57.8.

Here, as in the first crystallization process, the highly acidic mother liquor may be recycled and utilized as an ore leach acid or as make-up acid for RIC elution.

The recrystallized beryllium sulfate may then be fired at about 1000° C. (or higher) in a calcinator. The resulting sulfur dioxide and sulfur trioxide gas emanating from the calcinator may be recovered and used to produce more sulfuric acid in an adjacent plant producing acid for leaching incoming ore in the RIC process. The purity of the beryllium oxide obtained from the double crystallization process is 99+%.

An alternate process for crystallizing beryllium sulfate and thereafter producing beryllium oxide is illustrated in FIG. 2. The initial steps of this alternate process, namely concentrating, vacuum evaporating, diluting and crystallizing to produce $BeSO_4 \cdot 2H_2O$ crystals, are essentially the same as those already discussed with respect to the process illustrated in FIG. 1. The beryllium sulfate crystals thereby produced are then separated from the mother liquor and subsequently washed with an unused solution of 60% sulfuric acid. The wash solution and mother liquor may be thereafter recycled back into the system and used as a source of leaching acid in the RIC process. The washed crystals are then dissolved with water to form a solution which is filtered to remove any insoluble impurities, particularly calcium sulfate. This second crystallization feed solution has a typical composition substantially as follows:

|  | G./l. |
|---|---|
| $BeSO_4$ | 248 |
| $Al_2(SO_4)_3$ | .60 |
| $MgSO_4$ | .42 |
| $CaSO_4$ | .56 |
| $MnSO_4$ | .11 |
| $FeSO_4$ | .08 |
| F | None |
| $H_2O$ | 930 |
| $H_2SO_4$ | 80 |

Wt. percent $H_2SO_4$, 6.6.

The solution is then transferred to a vacuum evaporator-crystallizer where it is treated to evaporate it at about 120° F. to a sulfuric acid concentration of about 30% to 40% by weight sulfuric acid and a beryllium sulfate concentration of about 13% to 9% by weight during the course of which $BeSO_4 \cdot 4H_2O$ crystals are formed. The condensate is recycled to help dissolve the $BeSO_4 \cdot 2H_2O$ crystals obtained from the first crystallization preparatory for the recrystallization procedure. The crystals are separated from the mother liquor which contains substantially the following typical composition:

|  | G./l. |
|---|---|
| $BeSO_4$ | 191 |
| $Al_2(SO_4)_3$ | 1.10 |
| $MgSO_4$ | 1.26 |
| $CaSO_4$ | 1.36 |
| $MnSO_4$ | .30 |
| $FeSO_4$ | .22 |
| F | None |
| $H_2O$ | 790 |
| $H_2SO_4$ | 416 |

Wt. percent $H_2SO_4$, 34.3.

$BeSO_4 \cdot 4H_2O$ crystals having a particle size of between 500–2000μ are produced. These crystals are considerably larger than the crystals produced in the dihydrated form which have a size between 10–70μ.

The separated mother liquor formed during the evaporation and crystallization steps is thereafter recycled to assist in the dilution of the beryllium sulfate solution to bring the solution to a concentration having between about 50% to 55% sulfuric acid.

Since the crystals produced from this alternate method are much larger than those produced by the method illustrated in FIG. 1, the handling of the crystals in subsequent operations is thereby eased. For example, the crystals may be easily washed with water to free them of any free sulfuric acid prior to their calcination to beryllium oxide. The wash water may be then recycled to help dissolve the $BeSO_4 \cdot 2H_2O$ crystals for their recrystallization in much the same way as the condensate, as previously mentioned. The removal of this free sulfuric acid prior to calcination eliminates the possibility of an acid mist forming in the calcinator. It has been found that the presence of such a mist markedly interferes with the subsequent production of sulfuric acid in the acid plant.

A summary of the above noted typical solution compositions is given in Table 1.

TABLE 1.—SUMMARY OF TYPICAL SOLUTION COMPOSITIONS

| | Grams per liter | | | | | | | | | Wt. percent |
|---|---|---|---|---|---|---|---|---|---|---|
| | $BeSO_4$ | $Al_2(SO_4)_3$ | $MgSO_4$ | $CaSO_4$ | $MnSO_4$ | $FeSO_4$ | F | $H_2O$ | $H_2SO_4$ | $H_2SO_4$ |
| Evaporator feed | 86.3 | 14.1 | 2.07 | 2.31 | .96 | .11 | 3.10 | 744.5 | 390 | 31 |
| Evaporator discharge | 240.0 | 39.3 | 5.78 | 6.43 | 2.68 | .31 | 1.10 | 290 | 1,088 | 65 |
| Crystallization feed | 168.0 | 27.5 | 4.05 | 4.50 | 1.88 | .22 | .77 | 508 | 760 | 52 |
| Crystallization mother liquor | 19.0 | 31.1 | 4.59 | 5.08 | 2.12 | .24 | .87 | 507 | 860 | 60 |
| Dissolved first crystals | 248 | .60 | .42 | .56 | .11 | .08 | None | 930 | 80 | 6.6 |
| Second crystallization feed ($BeSO_4 \cdot 2H_2O$) | 122 | .37 | .26 | .35 | .07 | .05 | None | 635 | 799 | 52.7 |
| Second crystallization mother liquor ($BeSO_4 \cdot 2H_2O$) | 30 | .44 | .31 | .42 | .08 | .06 | None | 650 | 865 | 57.8 |
| Second crystallization feed ($BeSO_4 \cdot 4H_2O$) | 248 | .60 | .42 | .56 | .11 | .08 | None | 930 | 80 | 6.6 |
| Second crystallization mother liquor ($BeSO_4 \cdot 4H_2O$) | 191 | 1.10 | 1.26 | 1.36 | .30 | .22 | None | 790 | 416 | 34.3 |

Although not illustrated by the flow sheet, the invention is not limited to a one stage or a two stage crystallization process. The berylluim sulfate crystals obtained from the second crystallization process may be subject to a third crystallization by following the same procedure as is illustrated above where $BeSO \cdot 4H_2O$ is made. This would result in obtaining an even purer form of beryllium oxide. Further the processes described herein may be operated in a continuous manner or otherwise without departing from the scope of the invention.

Having described the invention with particular reference to the preferred forms thereof, it will be obvious to those skilled in the art to which this invention pertains, after understanding the invention, that various changes and modifications may be made therein without departing from the spirit and scope of the invention, as defined in the claims appended hereto.

We claim:

1. A process for recovering substantially pure beryllium oxide from an impure aqueous sulfuric acid solution containing dissolved beryllium sulfate which comprises:
   (a) adjusting the weight ratio of sulfuric acid to beryllium sulfate, expressed as beryllium oxide, to the range of from about 10:1 to about 25:1,
   (b) treating the solution to produce a solution containing about 50% to 55% by weight sulfuric acid,
   (c) cooling the treated solution to a temperature sufficiently low to crystallize beryllium sulfate therefrom and produce an acid mother liquor containing about 58% to 62% sulfuric acid,
   (d) separating the acidic mother liquor from the beryllium sulfate crystals, and
   (e) calcining the beryllium sulfate crystals to form high purity beryllium oxide.

2. A process according to claim 1 wherein the impure aqueous sulfuric solution is initially concentrated to form a solution containing about 62% to 66% by weight sulfuric acid and then diluted to a concentration of about 50% to 55% by weight sulfuric acid.

3. A process according to claim 1 wherein the solution is concentrated by evaporation under a vacuum.

4. A process according to claim 1 wherein the treated solution is cooled to a temperature in the range from about 40° F. to about 130° F. to crystallize $BeSO_4 \cdot 2H_2O$ crystals.

5. A process according to claim 1 wherein the beryllium sulfate crystals are calcined at a temperature of about 1000° C.

6. A process according to claim 1 wherein the crystallized beryllium sulfate crystals are separated from the mother liquor by centrifuging.

7. A process according to claim 1 further comprising, after step (c) and prior to step (d), the steps of:
   (i) redissolving the separated beryllium sulfate crystals in an aqueous solution,
   (ii) recrystallizing beryllium sulfate from the redissolved solution, and
   (iii) separating the acidic mother liquor from the recrystallized beryllium sulfate.

8. A process according to claim 7 wherein the beryllium sulfate crystals from step (c) are dissolved in water and sulfuric acid is added in an amount sufficient to establish a solution containing in the range of about 50% to 55% by weight sulfuric acid and wherein the solution is cooled thereafter to crystallize $BeSO_4 \cdot 2H_2O$.

9. A process according to claim 7 wherein the acidic mother liquor produced from step (iii) contains about 30% to 40% by weight sulfuric acid.

10. A process according to claim 9 wherein the redissolved beryllium sulfate solution is treated by vacuum evaporation.

11. A process according to claim 9 wherein the crystals formed by recrystallization are washed with water.

12. A process according to claim 7 wherein both crystallization steps take place at about 120° F.

13. A process according to claim 8 wherein the solution in which the berryllium sulfate crystals are dissolved is subsequently filtered to separate insoluble sulfates.

14. A process for recovering substantially pure beryllium oxide from an impure aqueous sulfuric acid solution containing dissolved beryllium sulfate, the solution having a concentration by weight of sulfuric acid at least about ten times as great but less than twenty-five times as great as the beryllium sulfate concentration as expressed as beryllium oxide which comprises:
   (a) treating the solution by evaporation under a vacuum to form a solution containing about 62% to about 66% by weight sulfuric acid,
   (b) diluting this solution to between about 50% and 55% by weight sulfuric acid,
   (c) cooling the evaporated solution to a temperature sufficiently low to crystallize beryllium sulfate therefrom and produce an acid mother liquor containing about 58% to 62% by weight sulfuric acid,
   (d) separating the acidic mother liquor form the beryllium sulfate crystals,
   (e) dissolving the separated beryllium sulfate crystals in an aqueous solution,
   (f) filtering the aqueous solution to eliminate any insoluble impurities,
   (g) evaporating the solution to form a solution containing about 30% to 40% by weight sulfuric acid,
   (h) recrystallizing the evaporated solution to produce $BeSO_4 \cdot 4H_2O$ crystals,
   (i) separating the acidic mother liquor from the recrystallized beryllium sulfate,
   (j) washing the separated crystals with water, and
   (k) calcining the recrystallized beryllium sulfate at a temperature of about 1000° C. to form a high purity beryllium oxide.

15. A process according to claim 14 wherein both crystallization steps take place at about 120° F.

16. A process according to claim 14 wherein the beryllium sulfate crystals are separated from the mother liquor by centrifuging.

(References on following page)

References Cited

UNITED STATES PATENTS

| | | | |
|---|---|---|---|
| Re. 20,274 | 12/1936 | Sawyer et al. | 23—24 B |
| 1,710,840 | 4/1929 | Price et al. | 23—24 B |
| 2,018,473 | 10/1935 | Sawyer et al. | 23—24 B |
| 2,160,547 | 5/1939 | Jaegen et al. | 23—24 B |
| 2,408,934 | 10/1946 | Kjellgren | 23—24 B |
| 3,145,081 | 8/1964 | Surls et al. | 23—183 |
| 3,148,022 | 9/1964 | Kruse | 23—24 B |
| 3,159,453 | 12/1964 | Biermann | 23—24 B |
| 3,395,975 | 8/1968 | Grunig et al. | 23—24 B |
| 2,974,011 | 3/1961 | Riabovol | 23—183 |

FOREIGN PATENTS

| | | | |
|---|---|---|---|
| 14,964 | 7/1964 | Japan | 23—183 |

HERBERT T. CARTER, Primary Examiner

U.S. Cl. X.R.

23—117, 183, 23